Aug. 14, 1934.  E. J. DENT  1,970,499
ROASTING APPARATUS
Filed Aug. 22, 1930  4 Sheets-Sheet 1

WITNESSES

INVENTOR
Edward J. Dent
BY
ATTORNEYS

Aug. 14, 1934.  E. J. DENT  1,970,499
ROASTING APPARATUS
Filed Aug. 22, 1930  4 Sheets-Sheet 2
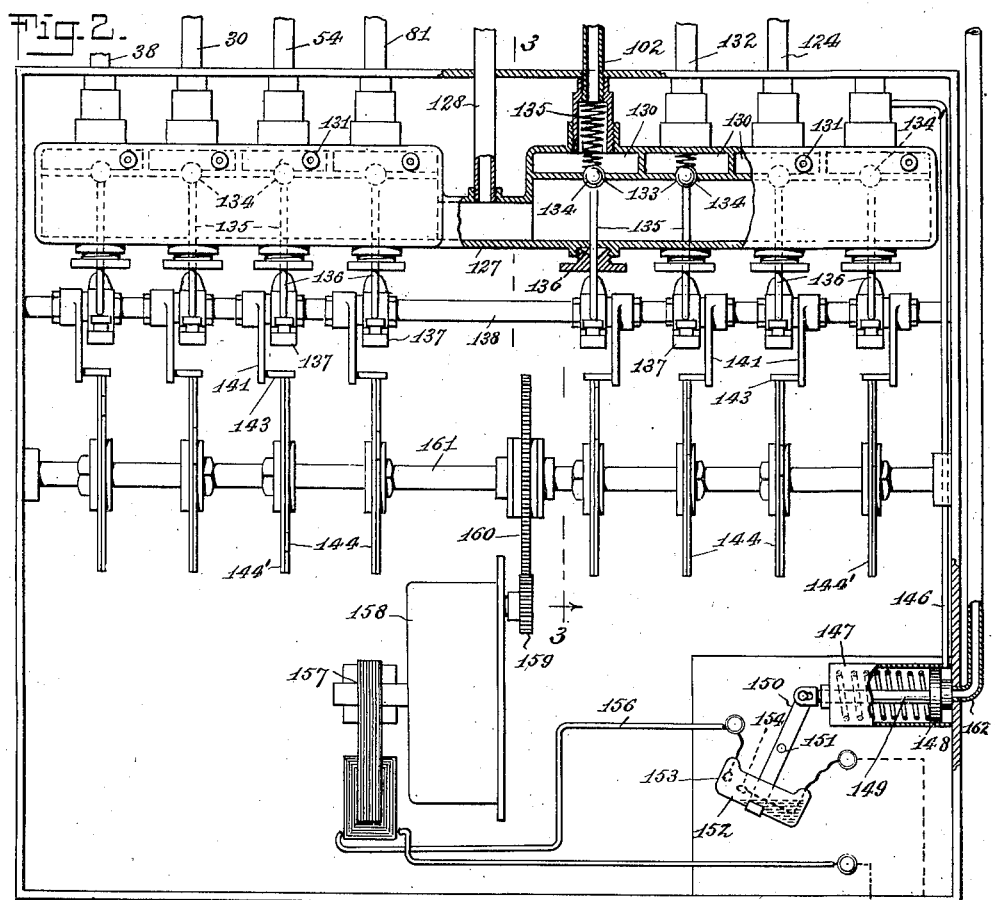
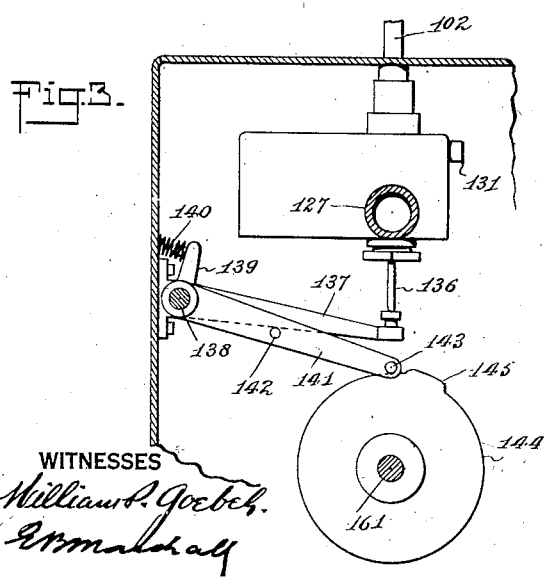
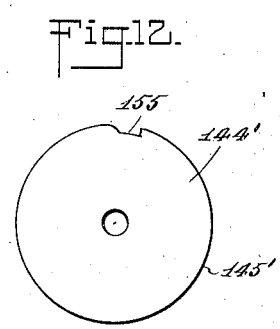
WITNESSES
INVENTOR
Edward J. Dent
BY
ATTORNEYS Aug. 14, 1934.   E. J. DENT   1,970,499
ROASTING APPARATUS
Filed Aug. 22, 1930   4 Sheets-Sheet 3

WITNESSES

INVENTOR
Edward J. Dent
BY
ATTORNEYS

Aug. 14, 1934.         E. J. DENT         1,970,499
ROASTING APPARATUS
Filed Aug. 22, 1930        4 Sheets-Sheet 4
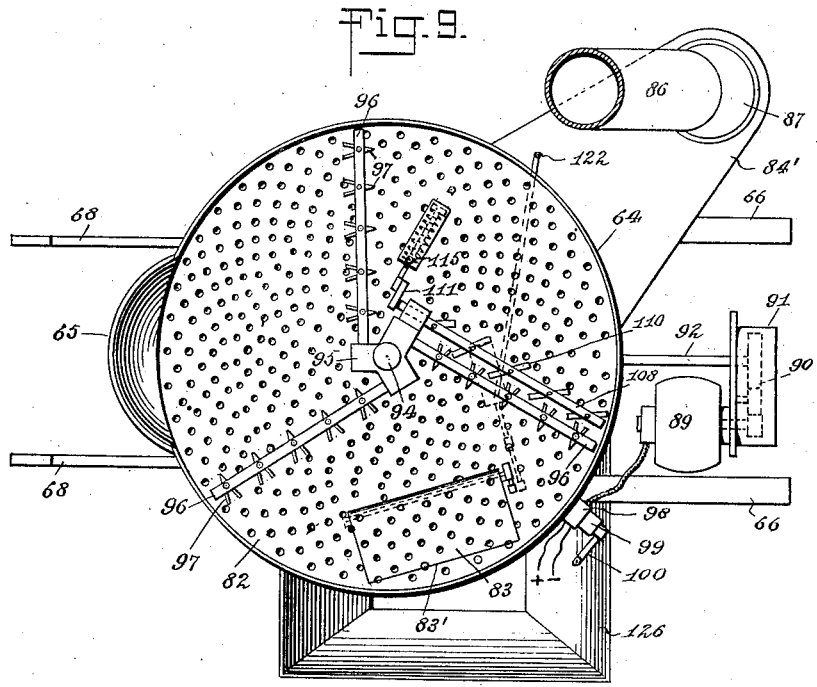
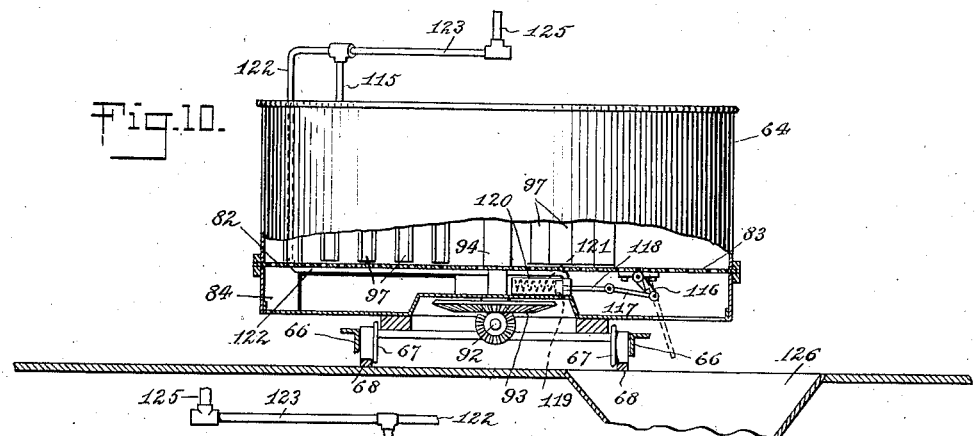
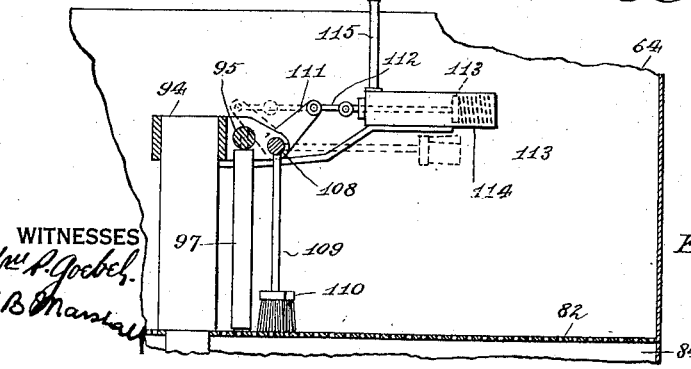
INVENTOR
Edward J. Dent
BY
Munn & Co.
ATTORNEYS Patented Aug. 14, 1934

1,970,499

UNITED STATES PATENT OFFICE 1,970,499

ROASTING APPARATUS

Edward J. Dent, Montclair, N. J., assignor to American Coffee Corporation, New York, N. Y., a corporation of New York Application August 22, 1930, Serial No. 477,158

33 Claims. (Cl. 34—5)

The invention relates to roasting apparatus, and more particularly coffee roasting apparatus, and one of the objects of the invention is to provide an apparatus which will operate automatically to carry out the different steps in the roasting process.

The invention also comprehends a coffee roasting apparatus provided with control means which will serve not only to carry out all the steps in a roasting cycle and also in a cooling cycle, but which will automatically start and complete a new roasting cycle on the completion of each roasting cycle and will start a cooling cycle on the completion of each roasting cycle, and in this manner keep the apparatus in continuous operation.

Another object of the invention is to provide an automatic control means which will at predetermined times operate means to carry out the different steps in the roasting cycle and also in the cooling cycle.

The roasting and cooling process may consist of the charging of a roaster with green coffee, the application of heat to the green coffee for a predetermined period, the application of a spray to the roasted coffee, the discharge of the roasted coffee into a cooler and the cooling of the coffee in a cooler, and the invention provides means for automatically carrying out these steps in the process in their proper relationship. The invention also provides automatic means in relation to the other steps of the process, for opening a damper to permit of the escape of steam when the spray is applied, for moving the cooler to receive the roasted coffee at the coffee roaster and for moving the cooler away from the coffee roaster, for directing a current of air through the coffee in the cooler, for operating means for stirring the coffee in the cooler and for operating means to discharge the coffee from the cooler.

Still another object of the invention is to provide automatic means which will recharge the coffee roaster with green coffee and start a new roasting cycle as soon as the coffee roasted in the previous cycle has been discharged into the cooler.

A further object of the invention is to provide automatic means for heating the coffee roaster at predetermined times and for turning off the heat in the coffee roaster when the temperature in the coffee roaster reaches a predetermined degree.

The invention furthermore comprehends an automatic roasting apparatus which is rapid and economical in operation and which gives uniformity in the finished roasted product thereby making it possible to maintain a finished product of very high quality.

Additional objects of the invention will appear in the following specification, in which the preferred form of the invention is described. In the drawings, similar reference characters refer to similar parts in all the views, in which Figure 1 is a side elevational view showing the coffee roasting apparatus;

Figure 2 is an enlarged sectional view illustrating the main valve control means;

Figure 3 is a sectional view on the line 3—3 of Figure 2;

Figure 9 is an enlarged plan view of the cooler;

Figure 10 is a side sectional elevation of the cooler illustrated in Figure 9;

Figure 11 is a vertical sectional fragmentary view of the cooler illustrating the means for moving the brushes to and from operative position; and Figure 12 is a view illustrating one of the cams in the main valve control means.

In order to obtain the greatest efficiency in coffee roasting apparatus, it is necessary that the roasting of the coffee and the cooling of the coffee be carried on continuously, and with the completion of each roasting cycle a coffee cooling cycle will be commenced without interruption. It is also important that with the commencement of the coffee cooling cycle, another coffee roasting cycle be commenced, so that each cycle of operation of the complete apparatus will include a coffee roasting cycle and a coffee cooling cycle which are carried on simultaneously. The invention which is the subject matter of this application provides an apparatus with automatic means for carrying on successive cycles of operation of the complete apparatus which includes means for roasting the coffee and also means for cooling the coffee after roasting.

Figure 1:
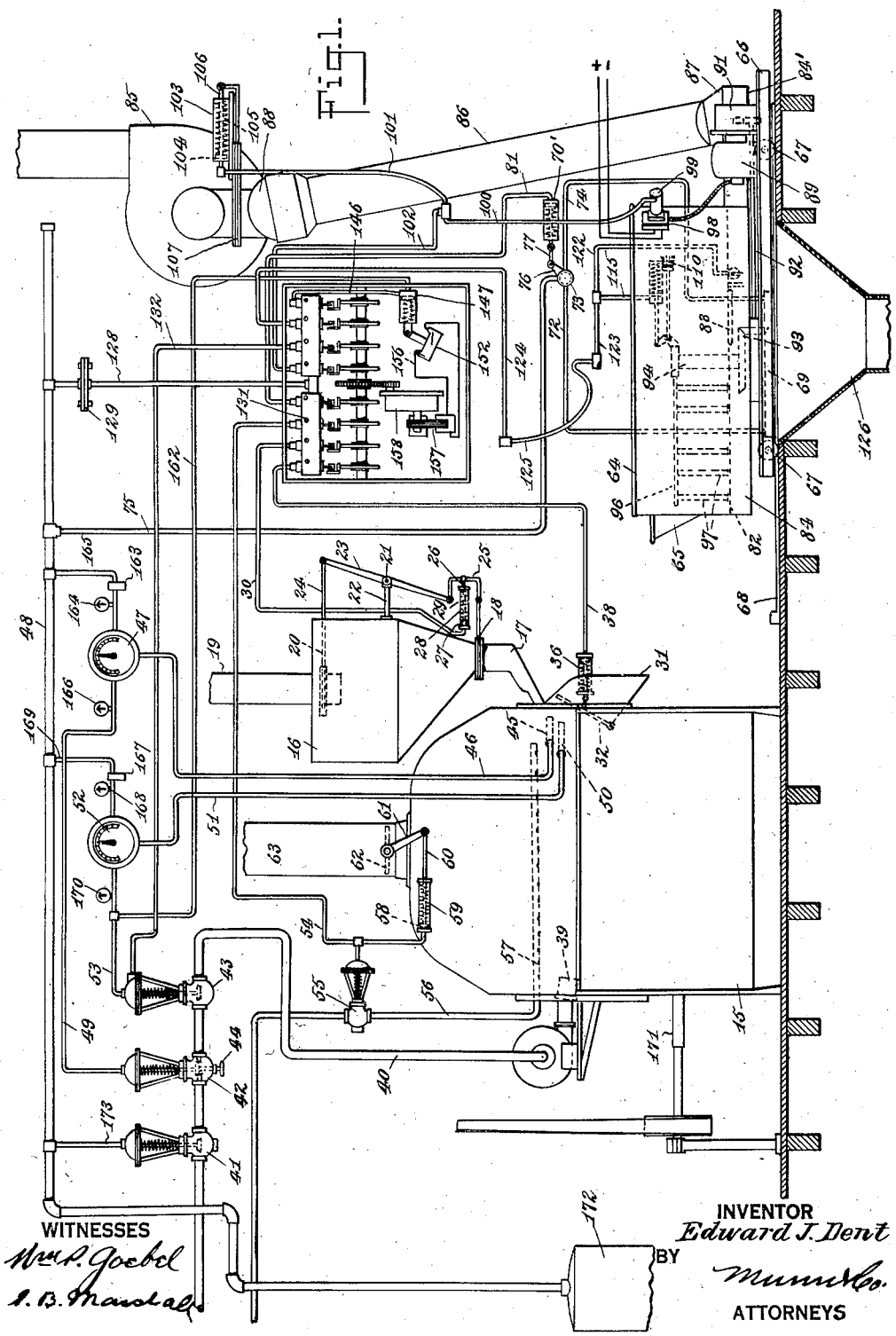
Figure 4:
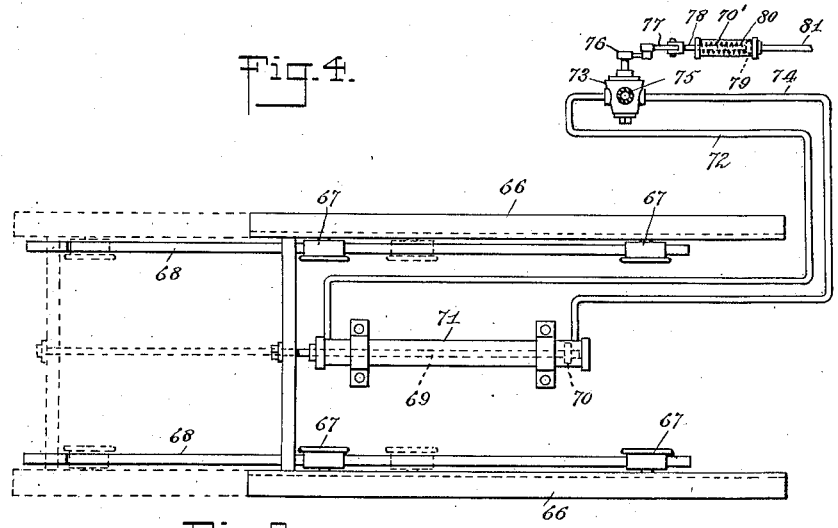
Figure 4 is an enlarged plan sectional view illustrating the means for moving the cooler to and from the coffee roaster.

By referring to the drawings, it will be seen that a coffee roaster 15 is provided, which may be of any well known type, with a rotating drum with vanes to carry the coffee up to a deflector, where the coffee will fall to the bottom of the drum, all of the well known construction but not shown in detail in the drawings. The coffee is fed to the coffee roaster from a hopper 16 which has an outlet 17 leading to the coffee roaster, controlled by a gate 18, there being an inlet 19 leading to the hopper 16, this inlet 19 being controlled by a gate 20. Fulcrumed at 21 to an arm 22 on the hopper 16, there is a lever 23, one arm 24 of which is articulated to the gate 20, the other arm of the lever 23 being articulated to a cross-head 25 which is articulated to the gate 18. The cross-head 25 is secured to a piston rod 26 which is secured to a piston 27 movable in a cylinder 28, a spring 29 being provided for holding the piston 27 to the left of the cylinder 28, as illustrated in Figure 1 of the drawings. However, when fluid pressure through the pipe 30 is fed to the cylinder, it will serve to move the piston 27 to the right against the resiliency of the spring 29, to open the gate 18 and close the gate 20, thereby permitting the green coffee from the hopper 16 to pass into the coffee roaster 15 and preventing the additional coffee from passing into the hopper 16 until the piston 27 again moves to the left to close the gate 18 and open the gate 20.

Figure 7:
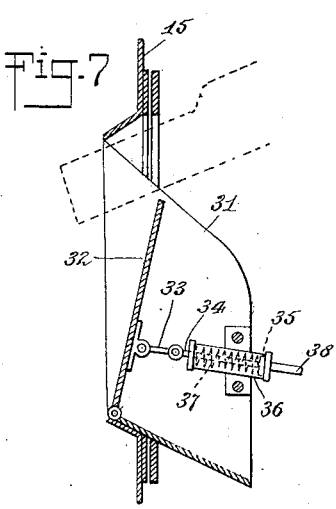
Figure 7 is an enlarged sectional view illustrating the door for closing the coffee outlet in the coffee roaster.
Figure 8:
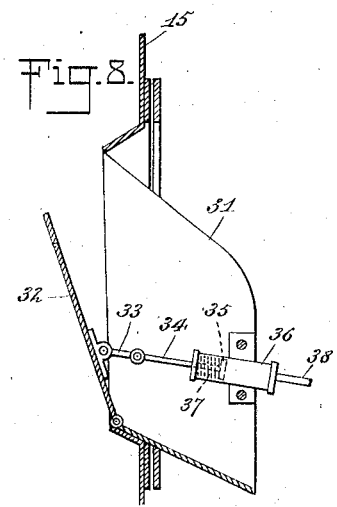
Figure 8 is a sectional view similar to the view illustrated in Figure 7 but with the door shown in open position.

The coffee roaster 15 is provided with a coffee outlet 31 which is normally closed by a door 32, as shown in Figure 7 of the drawings, this door 32 being connected by a link 33 with a piston rod 34 which is secured to a piston 35 in the cylinder 36, the piston 35 being held yieldingly to the right, as illustrated in Figure 7 of the drawings, by means of a spring 37. A pipe 38 leads to the cylinder 36 so that the fluid pressure may push the piston 35 to the left, to the position indicated in Figure 8 of the drawings, to open the door 32.

Gas is supplied to a burner 39 for heating the coffee roaster 15, through a pipe 40 commanded by valves 41, 42 and 43, the coffee roaster 15 being charged with green coffee in the manner described, after which the burner 39 is lighted by a pilot burner (not shown), the coffee in the coffee roaster being rotated in the customary manner. It will be seen that the valve 42 has an adjustment means 44 to prevent this valve from being completely shut off. When the temperature reaches a predetermined point in the coffee roaster 15, the thermostatic means 45 will serve to increase the pressure in the tube 46 leading to the thermostatic valve 47, opening this valve 47 to permit the fluid pressure to pass from the main pipe 48 through a pipe 49 to the valve 42 to partially close the said valve 42. This will serve to reduce the supply of gas fed to the burner 39, but the burner 39 will still be lighted, and although the gas supply has been reduced, the temperature will increase in the coffee roaster 15. At a second predetermined temperature, the thermostatic means 50 will operate to increase the pressure through the pipe 51 leading to the thermostatic valve 52 to permit air to flow from the main pipe 48 through the thermostatic valve 52 and the pipe 53 to the valve 43, which will serve to completely shut off the supply of gas through the pipe 40 to the burner 39.

On the complete shutting off of the gas, fluid pressure is supplied through the pipe 54 to the valve 55 controlling the water supply, to permit the water to pass through the pipe 56 to a sprinkler 57 disposed in the coffee roaster 15. By this means, the coffee will be sprinkled with water or other fluid. The pressure in the pipe 54 will also serve to press the piston 58 in a cylinder 59 which is connected by a piston rod 60 and a link 61 with a damper 62 leading to a vapor outlet 63. It will, therefore, be seen that as the coffee is sprayed with water, the vapor outlet 63 will be opened to permit the escape of vapor. The air pressure in the pipe 54 will be continued only long enough to properly sprinkle the coffee and permit of the escape of the steam or vapor, when the valve 55 and the damper 62 will close, and with this closing movement of the damper the door 32 will be opened to the position indicated in Figure 8 of the drawings, to permit the coffee to pass through the coffee outlet 31 to the cooler 64.

This cooler, which is referred to by the character 64, is moved by means which will now be described, toward the coffee roaster 15 before the door 32 is opened, so that when the door 32 has been opened, the roasted coffee will pass from the coffee outlet 31 to the neck 65 with which the cooler 64 is provided for receiving the coffee, the coffee passing to the interior of the cooler in a manner readily understood.

Figure 5:
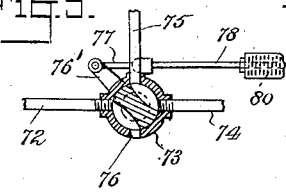
Figure 5 is an enlarged sectional view of the valve controlling the fluid pressure for operating the cooler.
Figure 6:
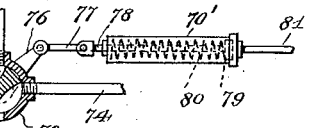
Figure 6 is a view similar to the view shown in Figure 5 but with the valve in another position.

This cooler 64 has a truck 66 with wheels 67 which travel on tracks 68. Secured to the truck 66, there is a piston rod 69 which extends from a piston 70 disposed in a cylinder 71, the cylinder 71 being secured relatively to the tracks 68, so that increase in pressure at one side of the piston 70 will serve to move the truck 66 in one direction, while increase in pressure in the cylinder at the other side of the piston 70 will serve to move the truck 66 in the opposite direction. A pipe 72 connects a valve 73 with one end of the cylinder 71, and a pipe 74 connects the valve 73 with the other end of the said cylinder. This valve 73 is not only connected with the pipes 72 and 74 but also with a pipe 75 which leads from the main pipe 48, the valve 73 also having an outlet port 76. It will, therefore, be seen that pressure from the main pipe 48 may be fed through the pipe 75 to the valve 73, which, when the valve is in the position illustrated in Figure 5 of the drawings, will serve to move the cooler 64 to the left, while when the valve 73 is in the position illustrated in Figure 6 of the drawings, the air pressure will serve to move the cooler 64 to the right. The valve 73 has an operating arm 76' connected by a link 77 with a piston rod 78 secured to a piston 79 in the cylinder 70', the piston 79 being held yieldingly to the right, as illustrated in Figure 6 of the drawings, by means of a spring 80. A pipe 81 leads to the cylinder 70 so that an increase in the pressure in the pipe 81 will serve to move the piston 79 to the left against the resiliency of the spring 80, to move the valve 73 to the position illustrated in Figure 5 of the drawings, where the fluid pressure will serve by the means described to move the cooler 64 to the left, this movement being regulated by means which will shortly be described, to supply air to the pipe 81.

As will best be seen by referring to Figure 10 of the drawings, the cooler 64 has a perforated floor 82 on which the coffee is disposed, an opening 83' in this floor being normally closed by a door or gate 83. Below the floor 82, the cooler 64 has a suction chamber 84 with an extending outlet 84' which is connected with a blower 85 by a pipe 86 which is articulated to the cooler 64 at 87 and to the blower 85 at 88. Any desired movable connection between the pipe 86, the cooler 64 and the blower 85 may be used. Mounted on the cooler 64, there is an electric motor 89 which is connected by a reduction gear 90 in a casing 91 with a shaft 92 for operating the latter, this shaft 92 being connected by gearing 93 for rotating a vertical shaft 94 in the cooler 64. This vertical shaft 94 has a spider 95 with arms 96 from which depend stirrers 97. A circuit 98 is connected with the motor 89, and in this circuit there is a switch 99 which is operated by an increase in pressure in the pipe 100, this pipe 100 and also the pipe 101 being fed by a pipe 102, the pipe 101 leading to a cylinder 103 for pressing a piston 104 in this cylinder to the right against the resiliency of a spring 105, a piston rod 106 being connected with the piston 104 and with a gate 107, connecting the pipe 86 with the blower 85. It will, therefore, be seen that with an increase in fluid pressure in the pipe 102, the switch 99 will be closed and the gate 107 will be opened, so that air will be drawn down through the coffee as it is being stirred by the stirrers 97 operated by the motor 89 and the means described.

Journaled in a bearing in the spider 95 in the cooler 64, there is a shaft 108 from which extend arms 109 carrying brushes 110, an arm 111 being secured to the said shaft 108, this arm 111 being connected by a link 112 with a piston rod secured to a piston 113 disposed in a cylinder 114, the piston 113 being held normally yieldingly to the left by means of the spring in the cylinder to hold the arms 109 with their brushes 110 in the position shown by the dotted lines in Figure 11, but it will be understood that when pressure passes through the pipe 115 to the cylinder 114, that this fluid pressure will move the piston 113 to the position shown in Figure 11 of the drawings to move the arms 109 with their brushes 110 to operative position, these brushes being disposed for brushing the coffee when the brushes are in position and the spider 95 is rotated to move the coffee to the opening 83', the gate or door 83 having been opened. Secured to the gate or door 83, there is an arm 116 connected by a link 117 with a piston rod 118 secured to a piston 119 disposed in a cylinder 120, the piston 119 being held yieldingly to the right by means of a spring 121, a pipe 122 leading to the cylinder 120 for feeding fluid pressure for moving the piston 119 to the left to open the gate or door 83, as indicated by the dotted lines in Figure 10 of the drawings. The pipes 115 and 122 are connected to a pipe 123 which is connected with a pipe 124 by a flexible tubing 125. It will, therefore, be seen that an increase in pressure in the pipe 124 will serve to open the gate or door 83 and at the same time will serve to move the brushes 110 to the position indicated in full lines in Figure 11 of the drawings, to sweep the coffee from the perforated floor 82 to the opening 83' therein, the coffee passing to a discharge pipe 126.

As will be understood from the above, when a charge of roasted coffee has been emptied from the coffee roaster 15 to the cooler 64, and as the roasted coffee in the cooler 64 is cooled by stirring and by passing a current of air downwardly through the coffee, a new charge of green coffee is fed into the coffee roaster 15, and this new charge of green coffee is roasted in the coffee roaster 15 as the cooling process in the cooler 64 proceeds, so that with the discharge of the cooled coffee from the coffee cooler 64, the cooler 64 will be ready to be moved into position to receive another charge of roasted coffee from the coffee roaster 15.

As has been stated, the control mechanism is operated by fluid pressure means. A main valve control means, which is best shown in Figure 2 of the drawings, is provided to regulate the action of the said fluid pressure means. This main valve control means has a chamber 127 with which the main pipe 48 is connected by a pipe 128, a strainer 129 being preferably disposed in this pipe 128. Above the chamber 127, there are a plurality of chambers 130, there being a bleed valve 131 leading from each of the chambers 130. The pipe 38 leading to the coffee door opener means is connected with one of the chambers 130, the pipe 30 leading to the means for charging and discharging the hopper 16 leading from another chamber 130, the pipe 54 for controlling the sprinkler and the vapor outlet leading from another chamber 130, the pipe 81 for controlling the movement of the cooler leading from another chamber 130, the pipe 102 for operating the gate leading to the blower 85 and the switch 99 leading from another chamber 130, and the pipe 124 for opening the door or gate 83 in the bottom of the cooler and for moving the brushes 110 to operative position leading from another chamber 130. There is also a pipe 132 connecting another chamber 130 with the valve 43, so that after fluid pressure has been fed to the valve 43 through the thermostatic valve 52 and the pipe 53, the pressure at the valve 43 will be maintained, for it will be understood that with the cooling of the thermostatic means, the thermostatic valve 52 will again be closed. In fact, this thermostatic valve 52 remains open only about one minute. It will also be understood that when the pressure in the pipe 132 is reduced, the valve 43 will be opened to permit gas to flow again through the pipe 40 to the burner 39 to be lighted by the pilot and to start a new coffee roasting cycle.

The partition separating each chamber 130 from the chamber 127 has a valve seat 133 which is commanded by a valve 134, each valve 134 being held on its seat 133 by a spring 135. Therefore, when a valve 134 is disposed on its seat 133, no pressure from the chamber 127, which is fed by the pipe 128, will reach the associated chamber 130 with its outlet pipe, and when the said valve 134 is seated on its seat, any pressure exceeding atmospheric pressure in the chamber 130 with its outlet pipe will escape through its associated bleed valve 131. Each valve 134 has a valve stem 135 which extends through an opening 136 in the bottom wall of the chamber 127, there being associated with each piston rod 136 for raising the piston rod, a lever 137, all the levers being mounted to rock on a shaft 138 and being held yieldingly downwardly by arms 139 extending upwardly from the lever 137 and pressed outwardly by springs 140, there being also mounted for rocking on the shaft 138 a plurality of arms 141, one as a companion for each of the arms 137, each of the arms 141 having a pin 142 disposed under its associated arm 137, so that with the upward movement of an arm 141, an arm 137 will also be raised. Each arm 141 has a follower 143 disposed at the periphery of a cam 144. Each of the cams 144 has a cam surface 145 engaging the follower 143 to raise the arm 141 and by the means described open a valve 134. The extent of the cam surface 145 on each of the cams 144 is regulated by the action which is desired.

As shown in Figure 12, a special cam 144' is provided for operating the valve 134' at the right of Figure 2 of the drawings, this valve 134' regulating the flow of fluid pressure through the pipe 146 which leads to a cylinder 147 in which there is a piston 148 with a piston rod 149 connected with a lever 150 pivoted at 151 and which carries a cup 152 forming part of a switch having one terminal at 153 and the other terminal at 154, there being mercury in the cup 152 which will serve to connect the terminals 153 and 154 when the piston 148 is moved to the left under fluid pressure controlled by the valve 134'. As will be seen by referring to Figure 12, in which the cam 144' is shown, this cam has a cam surface 145' which extends nearly around the cam 144', there being merely a depression at 155. This cam 144' serves to keep the cup 152 in a horizontal position to permit the mercury in the cup to connect the terminals 153 and 154 except when its follower 143 is disposed at the depression 155 in the cam surface 145'. The terminals 153 and 154 are connected with a circuit 156 which leads to an electric clock or motor 157 having driving gears in a gear casing 158 for rotating a gear 159 meshing with a gear 160 on the shaft 161, to which the cams 144 and 144' are secured. With the rotation of the cam 144', a complete cycle of the apparatus is effected, including a roasting cycle and a cooling cycle. As a means of starting a new cycle, when a follower 143 is disposed in the depression 155 in the cam surface 145' of the cam 144', a pipe 162 leads from the pipe 53 to the cylinder 147, and it will, therefore, be seen that when the thermostatic valve 52 is opened at the completion of a roasting cycle, that the air will flow not only through the pipe 53 to close the valve 43 and thereby cut off gas flowing through the pipe 40 to the burner 39, but it will also feed air to the pipe 162 to keep the piston 148 at the left of the cylinder 147 and against the resiliency of the spring in the cylinder 147 to keep the circuit 156 closed and permit the electric clock or motor to institute a new cycle of operation.

There is preferably a strainer 163 and a pressure gauge 164 in the pipe 165 leading from the main pipe 48 to the thermostatic valve 47, and there is also preferably a pressure gauge 166 in the pipe 49 leading from the said thermostatic valve 47. There is also preferably a strainer 167 and a pressure gauge 168 in the pipe 169 leading from the main pipe 48 to the thermostatic valve 52, and a pressure gauge 170 in the pipe 53 leading from the thermostatic valve 52 to the valve 43.

As has been stated, the coffee in the coffee roaster 15 is disposed in the usual type of drum, and this drum is rotated by a shaft 171 which is driven in any suitable manner. An air compressor 172 is provided for feeding the air under pressure to the pipe 48. It will be understood that when the air compressor 172 is inoperative, not only will the gas be shut off but the electric clock or motor 157 will also stop. The gas is shut off by the valve 41 which is a reverse valve and is closed by its spring when the pressure in the pipe 48 falls below a predetermined point. The valve 41 is connected with the main pipe 48 by a pipe 173.

When it is desired to commence to operate the apparatus, the air is compressed in the air compressor 172 and with the operation of a cam 144 which serves by the means described to raise a piston rod 136 connected with a valve 134 which controls communication between the chamber 127 and the pipe 30, air will be permitted to flow through the pipe 30 to operate the piston 27 in the cylinder 28, which will serve to feed green coffee from the hopper 16 to the coffee roaster 15 and will subsequently again charge the hopper 16 with green coffee. The cam 144 operating a valve which communicates with the pipe 132 will then be operated to free the valve 43 from excess pressure, permitting the valve 43 to open, thereby feeding gas through the pipe 40 to the burner 39 to be lighted by the usual pilot. With the rotation of the shaft 171, the roasting process will then continue until the temperature in the roaster reaches a predetermined point, when the thermostatic means 45 will operate to open the thermostatic valve 47, permitting air to flow through the pipe 49 to the valve 42 and partially close this valve 42, the complete closure of the valve 42 being prevented by the adjusting means 44. Although the flow of gas has in this manner been decreased, nevertheless, the temperature will continue to rise in the coffee roaster 15, and when the temperature reaches another predetermined point, the thermostatic means 50 will operate to open the thermostatic valve 52, permitting air to flow through the pipe 53 to the valve 43, thereby closing the said valve and cutting off all flow of gas to the burner 39. Air will also pass from the pipe 53 through the pipe 162 to the cylinder 147, keeping the pressure against the piston 148, while momentarily the flow of the fluid pressure through the pipe 146 is discontinued because of the follower 143 being disposed at the depression 155 in the cam 144'. One of the cams 144 will then operate the valve controlling communication through the pipe 54 to operate the valve 55 which will feed through the pipe 56 water to a sprayer 57, the air pressure through the pipe 54 at the same time by the piston 58 which has been described opening the vapor damper 62. This will serve to spray the coffee and permit the vapor and steam to escape. Substantially at the same time the cam which controls communication through the pipe 81 is operated to permit air to flow through the pipe 75 through the valve 73 to the cylinder 71 to move the piston 70 and the piston rod 69 to move the cooler 64 to a position where it will receive the roasted coffee when the sprinkling of the coffee has been completed and the door 32 at the coffee outlet 31 is opened by means of the passage of air through the pipe 38 which is controlled by a valve 134 operated by one of the cams 144.

With the roasted coffee disposed in the cooler 64, a new roasting cycle takes place as a cooling cycle commences, the roasting cycle operating as has been described. The cooling cycle commences as the valve 73 is operated under the influence of the spring 80, the air or fluid pressure in the pipe 81 having been reduced by the closing of the valve which controls the supply of fluid pressure to the pipe 81 under the action of its associated cam 144. With the return of the cooler 64 to the position indicated in Figure 1 of the drawings, air will be fed through the pipe 102 from the chamber 127 by the movement of a valve 134 relatively to its valve seat 133, and this air or fluid pressure supplied through the pipe 102 will open the gate 107 leading to the blower 85 and will at the same time close the switch 99 by the means described to operate the motor 89 which will by the means described stir the coffee in the cooler 64 as air is drawn downwardly through the coffee to the suction blower 85. At the end of the cooling process, another of the valves 134 will operate to permit air to pass through the pipes 124, 125 and 123 to the pipe 115, the air or fluid pressure in this pipe 115 by the means described serving to bring the brushes 110 to operative position and the air or fluid pressure in the pipe 122 serving by the means described to open the door 83. With the door open and with the continued rotation of the spider 95 driven by the motor 89, the gearing 90, the shaft 92 and the gearing 93, the coffee will be brushed by the brushes 110 towards the opening 83' in the perforated floor of the cooler 64 to pass down through the discharge pipe 126. The cooling process having been completed and the coffee having been discharged from the cooler 64, the cooler 64 is again ready to receive a second roast of coffee from the coffee roaster 15, a second roasting cycle in the coffee roaster 15 having been completed.

It is understood that each of the several cams 144 is provided with a cam surface 145 of a particular length to hold the valve controlled thereby open a predetermined time to permit air to escape through one of the pipes leading from the said valve, the air in the said pipe when the valve is again closed passing through a bleed valve 131 in the chamber 130 in which the valve operates.

It will be understood that the apparatus which has been described may be employed not only to roast coffee but also to roast beans of various kinds, peanuts, cocoa beans, and other products.

What is claimed is:

1. In a roasting apparatus, a roaster having an inlet and an outlet, a sprinkler in the roaster, means for opening the inlet, means for operating the sprinkler, means for opening the outlet after the operation of the sprinkler, a pipe for supplying gas to the roaster, a valve in the pipe having closing means, control means for periodically operating the first, second, third and fourth mentioned means, and a thermostatic means operable independently of the fifth mentioned means for operating the closing means for the valve when the temperature in the roaster reaches a predetermined degree.

2. In a roasting apparatus, a roaster having a coffee inlet, a vapor outlet and a coffee outlet, a sprinkler in the roaster, means for opening the coffee inlet, means for opening the vapor outlet and for operating the sprinkler, means for opening the coffee outlet after the operation of the second mentioned means, means for periodically and successively operating the first, second and third mentioned means and means operable by the fourth mentioned means for periodically heating the roaster between the operation of the first and second mentioned means.

3. In a roasting apparatus, a roaster having an inlet and an outlet, means for opening the inlet, means for opening the outlet, means for supplying heat to the roaster between the operation of the first and second mentioned means, means for diminishing the supply of heat when the temperature of the roaster reaches a predetermined point and for subsequently cutting off the supply of heat at the end of the roasting operation, thermostatic means for controlling the last-mentioned means and means for periodically and automatically operating the first and second mentioned means.

4. In a roasting apparatus, a roaster having a coffee inlet, a coffee outlet and a vapor outlet, a sprinkler in the roaster, means for opening the coffee inlet, means for opening the vapor outlet and for operating the sprinkler, means for opening the coffee outlet, means for supplying heat to the roaster between the operation of the first and second mentioned means, means for cutting off the supply of heat when the temperature in the roaster reaches a predetermined point and means for periodically operating the first, second, third and fourth mentioned means.

5. In a roasting apparatus, a roaster having a coffee outlet, a cooler for receiving the roasted coffee from the coffee outlet, means for opening the coffee outlet, means for moving the cooler to the roaster before the operation of the first mentioned means and subsequently moving the cooler away from the roaster and pneumatic means for automatically operating the first and second mentioned means.

6. In a roasting apparatus, a roaster having an inlet and an outlet, means for opening the inlet, means for opening and closing the outlet, a cooler for receiving the roasted coffee from the outlet, means for moving the cooler to the roaster before the operation of the second mentioned means and for subsequently moving the cooler away from the roaster, periodic means for heating the roaster between the operation of the first and second mentioned means and means for periodically and successively operating the first, second and third mentioned means.

7. In a roasting apparatus, a roaster having a coffee inlet, a coffee outlet and a vapor outlet, a sprinkler for the roaster, means for opening the coffee inlet, means for opening the vapor outlet and for operating the sprinkler, means for opening and closing the coffee outlet, a cooler for receiving the coffee from the coffee outlet, means for moving the cooler towards the roaster before the operation of the third mentioned means and for subsequently moving the cooler away from the roaster, means for heating the roaster between the operation of the first and second mentioned means and means for operating the first, second, third, fourth, and fifth mentioned means.

8. In a roasting apparatus, a roaster having an outlet, means for opening the outlet, a cooler for receiving coffee at the roaster outlet, the cooler having an outlet, means for moving the cooler towards the roaster before the operation of the first mentioned means and for subsequently moving the cooler away from the roaster, means for operating the cooler outlet and pneumatic means for automatically operating the first, second and third mentioned means.

9. In a roasting apparatus, a roaster having an outlet, means for opening the outlet, a cooler for receiving the coffee at the outlet, the cooler having an outlet, means for directing air through the cooler, means for stirring the coffee in the cooler, means for opening the cooler outlet and pneumatic means for automatically operating the first, second, third and fourth mentioned means at predetermined times.

10. In a roasting apparatus, a roaster having an outlet, means for opening the outlet, a cooler for receiving the coffee at the outlet, the cooler having an outlet, stirrers in the cooler, means for operating the stirrers, means for opening the cooler outlet and pneumatic means for automatically operating the first, second and third mentioned means at predetermined times.

11. In a roasting apparatus, a roaster having an outlet, a cooler for receiving coffee at the roaster outlet, the cooler having an outlet, adjustable means in the cooler for brushing the coffee to the cooler outlet, means to move the first mentioned means into operative position, means to open the roaster outlet, means to open the cooler outlet and pneumatic means for automatically operating the second, third and fourth mentioned means at predetermined times.

12. In a roasting apparatus, a roaster having a coffee inlet, a coffee outlet and a vapor outlet, a sprinkler in the roaster, means to open the coffee inlet, means to supply heat to the roaster, means to operate the sprinkler and to open the vapor outlet, means to open the coffee outlet, means to operate the first, second, third and fourth mentioned means and means to cut off the heat supply when the temperature in the roaster reaches a predetermined point.

13. In a roasting apparatus, a roaster having a coffee inlet, a coffee outlet and a vapor outlet, a sprinkler in the roaster, means to open the coffee inlet, means to supply heat to the roaster, means to operate the sprinkler and to open the vapor outlet, means to open the coffee outlet, a cooler for receiving coffee from the coffee outlet, the cooler having an outlet, means to open the cooler outlet, means to cool the coffee in the cooler, means to operate the first, second, third, fourth, fifth and sixth mentioned means at predetermined times and means to cut off the heat supply when the temperature in the roaster reaches a predetermined point.

14. In a roasting apparatus, a roaster having a coffee inlet, a fuel gas inlet and a coffee outlet, a fluid pressure means for operating the coffee inlet, a fluid pressure means for operating the gas inlet, a fluid pressure means for operating the coffee outlet, a cooler for receiving coffee from the coffee outlet, the cooler having an outlet, means to cool the coffee in the cooler, a fluid pressure means for operating the fourth mentioned means, a fluid pressure means for opening the cooler outlet and a main fluid control means connected with a source of fluid pressure and with the first, second, third, fifth and sixth mentioned means for operating the latter.

15. In a roasting apparatus, a roaster having a coffee inlet, a fuel gas inlet and a coffee outlet, a fluid pressure means for operating the coffee inlet, a fluid pressure means for operating the gas inlet, a fluid pressure means for operating the coffee outlet, a cooler for receiving coffee from the coffee outlet, the cooler having an outlet, means to cool the coffee in the cooler, a fluid pressure means for operating the fourth mentioned means, a fluid pressure means for opening the cooler outlet, a main fluid control means connected with a source of fluid pressure and with the first, second, third, fifth and sixth mentioned means for operating the latter and means to cut off the supply of gas at the gas inlet when the temperature in the roaster reaches a predetermined point irrespective of the position of the main fluid control means.

16. In a roasting apparatus, a roaster, a pipe for supplying gas to the roaster, means for closing communication through the pipe, thermostatic means for operating the first mentioned means, means for keeping the first mentioned means in operation after it is operated by the thermostatic means, and means for rendering the third mentioned means inoperative periodically.

17. In a roasting apparatus, a roaster having an opening, a door for closing the opening, a fluid pressure means for operating the door, a fluid pressure control connected with the fluid pressure means and with a fluid pressure source, means for operating the fluid pressure control, means for keeping the second mentioned means in operative position at predetermined periods and means operable at the fluid pressure source for keeping the second mentioned means in inoperative position at other periods.

18. In a roasting apparatus, a roaster having an opening and a gas supply, a door for closing the opening, a valve for shutting off the supply of gas, a communicating means connected with the valve for closing the latter on a change of pressure in the communicating means, means operable by an increase of temperature in the roaster to a predetermined point to open communication in the communicating means, a fluid control means for operating the door, a main fluid control valve connected with the third mentioned means for operating the latter, means for operating the main fluid control valve, means connected with the main fluid control valve for keeping the fourth mentioned means in operative position at predetermined periods in the cycle of operation and means operable by a change in pressure in the communicating means between the first mentioned valve and the second mentioned means to keep the fourth mentioned means in operative position at another period in the cycle of operation.

19. In a roasting apparatus, a roaster having an opening and a gas supply, a door for closing the opening, a valve for shutting off the supply of gas, a communicating means connected with the valve for closing the valve on a change of pressure in the communicating means, means operable by an increase of temperature in the roaster to a predetermined point to open communication in the communicating means, a fluid control means for operating the door, a main fluid control valve connected with the third mentioned means for operating the latter, electrical power means with a circuit for operating the main fluid control valve, a switch in the circuit, means connecting the main fluid control valve with the switch for holding the latter in a predetermined position at predetermined periods in the cycle of operation and means operable by a change of pressure in the communicating means between the valve and the second mentioned means to hold the switch in the said predetermined position at another period in the cycle of operation.

20. In a roasting apparatus, a roaster having an opening and a gas supply, a door for closing the opening, a valve for shutting off the supply of gas, a communicating means connected with the valve for closing the valve on a change of pressure in the communicating means, means operable by an increase of temperature in the roaster to a predetermined point to open communication in the communicating means, a fluid control means for operating the door, a main fluid control valve connected with the third mentioned means for operating the latter, electrical power means with a circuit for operating the main fluid control valve, a switch in the circuit, means connecting the main fluid control valve with the switch for holding the latter in a predetermined position at predetermined periods in the cycle of operation, means operable by a change of pressure in the communicating means between the valve and the second mentioned means to hold the switch in the said predetermined position at another period in the cycle of operation and operative means connecting the main fluid control valve with the first mentioned valve.

21. In a roasting apparatus, a fluid control means, a main fluid control valve connected with the fluid control means for operating the latter, electrical power means with a circuit for operating the main fluid control valve, a switch having operating means in the circuit, means connecting the main fluid control valve with the switch operating means for holding the switch in a predetermined position at a predetermined period in the cycle of operation and a separate means for holding the switch operating means in a predetermined position at another period in the cycle of operation.

22. In a roasting apparatus, a roaster having an opening, means to control the passage of material through the opening, a control means, a fuel gas pipe leading to the roaster, a valve in the pipe, thermostatic means connecting the roaster with the valve for operating the latter, means cooperating with the second mentioned means and the valve to regulate the action of the latter, means to operate the control means, means connecting the control means with the fifth mentioned means to stop the latter, and means connecting the valve with the sixth mentioned means to prevent the operation of the latter when the valve is closed.

23. In a roasting apparatus, a roaster, a pipe for supplying gas to the roaster, a valve operable by fluid pressure for closing communication through the pipe, fluid pressure means for operating the valve, thermostatic means for operating the fluid pressure means, a second fluid pressure means for keeping the valve closed after it has been closed by the first fluid pressure means, and means for rendering the second fluid pressure means inoperative periodically.

24. The combination with a roaster having a plurality of movable parts for discharging roasted material and for supplying measured amounts of fresh material to the roaster, of a cooler adapted to receive roasted material from said roaster, an air main, a pipe between said air main and said cooler, a shutter in said pipe controlling the passage of air through said cooler, a door in said cooler for discharging the material when cooled, rotatable members in said cooler for stirring said material and propelling same toward said discharge door, a plurality of movable parts for operating said shutter, door and rotatable members, a control member operable in definite time cycles, means operated by said control member for operating said movable parts in predetermined sequence during a time cycle, and means for stopping the operation of said control member at the conclusion of a time cycle.

25. The combination with a roaster having a plurality of movable parts for discharging roasted material and for supplying measured amounts of fresh material to the roaster, of a cooler adapted to receive roasted material from said roaster, an air main, a pipe between said air main and said cooler, a shutter in said pipe controlling the passage of air through said cooler, a door in said cooler for discharging the material when cooled, rotatable members in said cooler for stirring said material and propelling same toward said discharge door, a plurality of movable parts for operating said shutter, door and rotatable members, a control member operable in definite time cycles, means operated by said control member for operating said movable parts in predetermined sequence during a time cycle, means controlled by the temperature of the roasted material for operating said control member to initiate a time cycle, and means for stopping the operation of said control member at the conclusion of a time cycle.

26. The combination with a roaster having a plurality of movable parts for discharging roasted material and for supplying measured amounts of fresh material to the roaster, of a traveling cooler car having a plurality of movable parts for moving said car toward and away from said roaster and for discharging the roasted material at a point remote from the roaster when cooled, a rotatable member having means for operating said movable parts in predetermined sequence and at definite times, and means controlled by said member for stopping its own rotation at the conclusion of a complete cycle of operations.

27. The combination with a roaster having a plurality of movable parts for discharging roasted material and for supplying measured amounts of fresh material to the roaster, of a traveling cooler car having a plurality of movable parts for moving said car toward and away from said roaster and for discharging the roasted material at a point remote from the roaster when cooled, a rotatable member having means for operating said movable parts in predetermined sequence and at definite times, and means controlled by the temperature of the roasted material for rotating said member.

28. The combination with a roaster having a plurality of movable parts for discharging roasted material and for supplying measured amounts of fresh material to the roaster, of a travelling cooler car having a plurality of movable parts for moving said car toward and away from said roaster and for discharging the roasted material at a point remote from the roaster when cooled, a rotatable member having means for operating said movable parts in predetermined sequence and at definite times, a thermostat responsive to changes in the temperature of the roasting material, and means operated by said thermostat for rotating said member.

29. The combination with a roaster having means for heating the material to be roasted and having a plurality of movable parts for discharging roasted material and for supplying measured amounts of fresh material to the roaster, of a traveling cooler car having a plurality of movable parts for moving said car toward and away from said roaster and for discharging the roasted material at a point remote from the roaster when cooled, a control member operable in definite time cycles, means controlled by said member for operating said movable parts in predetermined sequence during a time cycle, and means controlled by the temperature of the roasted material for shutting off said heating means and for operating said control member at the conclusion of a roast.

30. The combination with a roaster having means for heating the material to be roasted and having a plurality of movable parts for discharging roasted material and for supplying measured amounts of fresh material to the roaster, of a traveling cooler car having a plurality of movable parts for moving said car toward and away from said roaster and for discharging the roasted material at a point remote from the roaster when cooled, a control member operable in definite time cycles, means controlled by said member for operating said movable parts in predetermined sequence during a time cycle, means controlled by the temperature of the roasted material for operating said control member, and means operated by said control member for shutting off said heating means at the beginning of a time cycle and for turning on said heating means at a predetermined time during a time cycle.

31. The combination with a roaster having a plurality of movable parts for discharging roasted material and for supplying measured amounts of fresh material to the roaster, of a traveling cooler car adapted to receive roasted material from said roaster and to discharge said material at a point remote from the roaster when cooled, an air main, an extensible pipe connected between said air main and said cooler car to permit variation of the distance between said main and said car, a shutter in said pipe controlling the passage of air through said cooler, a door in said cooler for discharging the material when cooled, rotatable members in said cooler for stirring said material and propelling same toward said discharge door, a plurality of movable parts for operating said shutter, said door and said rotatable members and for moving said cooler car toward and away from said roaster, a control member operable in definite time cycles, means operated by said control member for operating said movable parts in predetermined sequence during a time cycle, and means for stopping the operation of said control member at the conclusion of a time cycle.

32. A fluid-pressure operated roaster having a plurality of movable parts for discharging roasted material and for supplying measured amounts of fresh material to the roaster, a fuel supply pipe, a fuel cock controlling the flow of fuel in said pipe, a smoke pipe having a damper, a plurality of movable parts for operating said fuel cock and said damper, a plurality of power cylinders supplied with fluid from a pressure source and having means for operating said movable parts, a plurality of valves having pistons controlling the flow of pressure fluid to the respective power cylinders, a rotatable member having a plurality of cams for operating said pistons in predetermined sequence to move said parts through a timed cycle of operations, and means controlled by the temperature of the roasted material for operating said rotatable member.

33. In a roasting apparatus, a roaster having an outlet, means for opening the outlet, a cooler for receiving the coffee at the outlet, the cooler having an outlet, stirrers in the cooler, means for operating the stirrers, means for opening the cooler outlet and fluid-pressure means for automatically operating the first, second and third mentioned means at predetermined times.

EDWARD J. DENT.